United States Patent [19]

Morimoto

[11] Patent Number: 5,327,280
[45] Date of Patent: * Jul. 5, 1994

[54] SCANNING OPTICAL SYSTEM

[75] Inventor: Akira Morimoto, Tokyo, Japan

[73] Assignee: Asahi Kogaku Kogyo Kabushiki Kaisha, Tokyo, Japan

[*] Notice: The portion of the term of this patent subsequent to Jul. 28, 2009 has been disclaimed.

[21] Appl. No.: 582,166

[22] Filed: Sep. 14, 1990

[30] Foreign Application Priority Data

Sep. 14, 1989 [JP] Japan .................. 1-239153

[51] Int. Cl.⁵ ............................................. G02B 26/10
[52] U.S. Cl. .................................. 359/216; 359/205; 359/212
[58] Field of Search .................. 350/6.5, 6.8, 6.9, 6.91, 350/6.1, 6.3; 250/234–236, 207, 212, 216–219; 359/196–226, 662

[56] References Cited

U.S. PATENT DOCUMENTS

| | | | |
|---|---|---|---|
| 3,360,659 | 4/1964 | Young | 250/236 |
| 4,099,829 | 7/1978 | Straayer | 350/6.1 |
| 4,128,297 | 12/1978 | Bourne | 350/6.9 |
| 4,274,101 | 6/1981 | Kataoka et al. | 359/210 |
| 4,521,113 | 6/1985 | Kuwabara et al. | 359/221 |
| 4,620,768 | 11/1986 | Tatsuno et al. | 359/218 |
| 4,715,699 | 12/1987 | Morimoto | 350/6.8 |
| 4,733,064 | 3/1988 | Ishikawa | 350/6.8 |
| 4,756,583 | 7/1988 | Morimoto | 350/6.5 |
| 4,850,686 | 7/1989 | Morimoto et al. | 350/484 |
| 4,863,227 | 9/1989 | Takanashi | 350/6.8 |
| 4,906,061 | 3/1990 | Yamaguchi | 350/6.3 |
| 4,930,869 | 6/1990 | Miyagawa et al. | 359/217 |
| 5,134,513 | 7/1992 | Morimoto | 359/218 |
| 5,194,982 | 3/1993 | Morimoto | 359/216 |

FOREIGN PATENT DOCUMENTS

| | | | |
|---|---|---|---|
| 3115298 | 3/1983 | Fed. Rep. of Germany . | |
| 88016 | 7/1980 | Japan | 359/218 |
| 294410 | 12/1986 | Japan | 359/218 |
| 63-146015 | 6/1988 | Japan . | |
| 2157454 | 10/1985 | United Kingdom | 359/220 |

*Primary Examiner*—Loha Ben
*Assistant Examiner*—Thong Nguyen
*Attorney, Agent, or Firm*—Sandler, Greenblum & Bernstein

[57] ABSTRACT

A scanning optical system according to the present invention comprises a laser light source, a scanning deflector for deflecting a laser beam from said laser light source, a scanning lens for focusing deflected light on a scanning surface, a focusing point changing element for changing a focusing point so that a curvature of field is reduced.

17 Claims, 12 Drawing Sheets

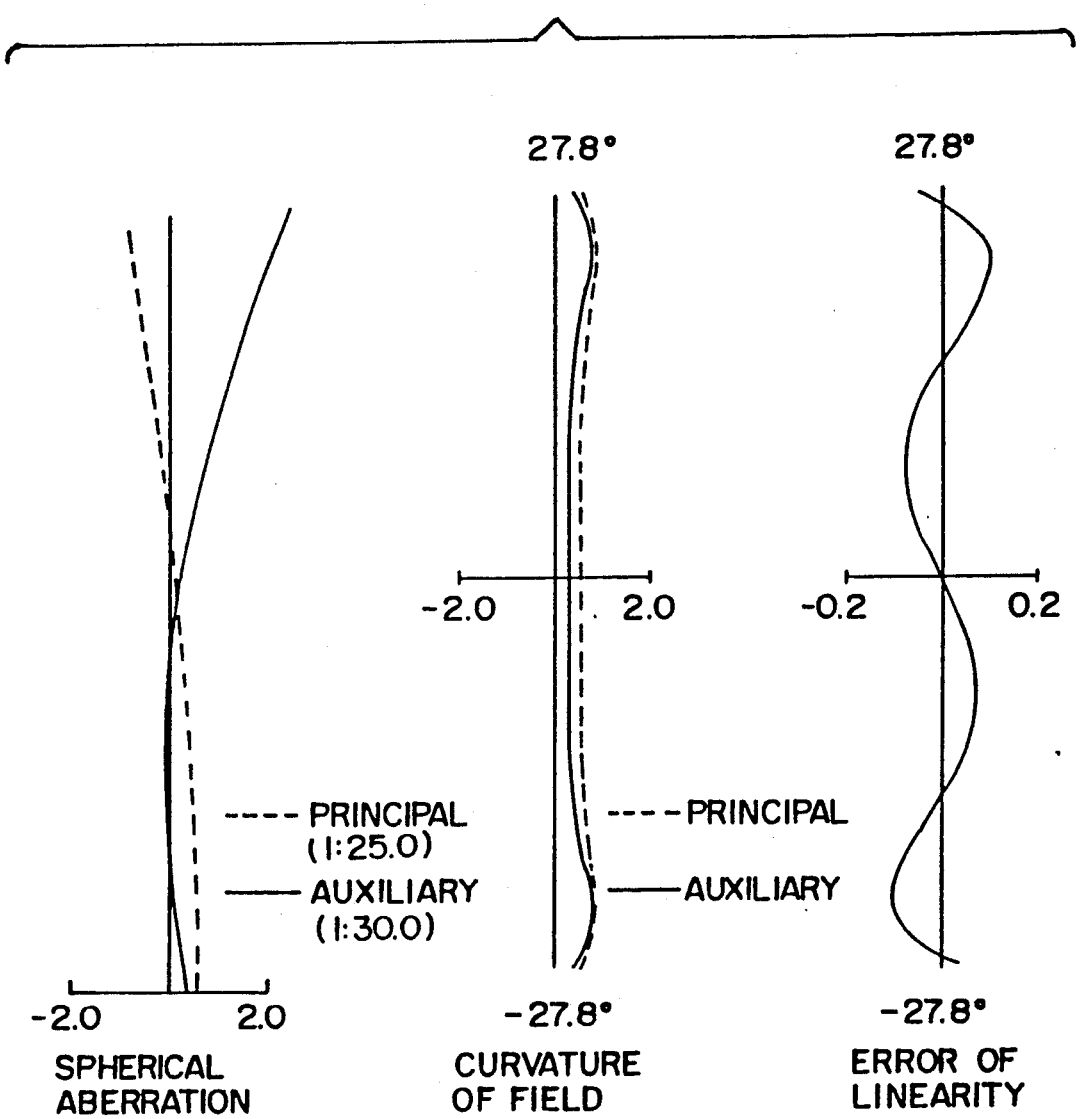

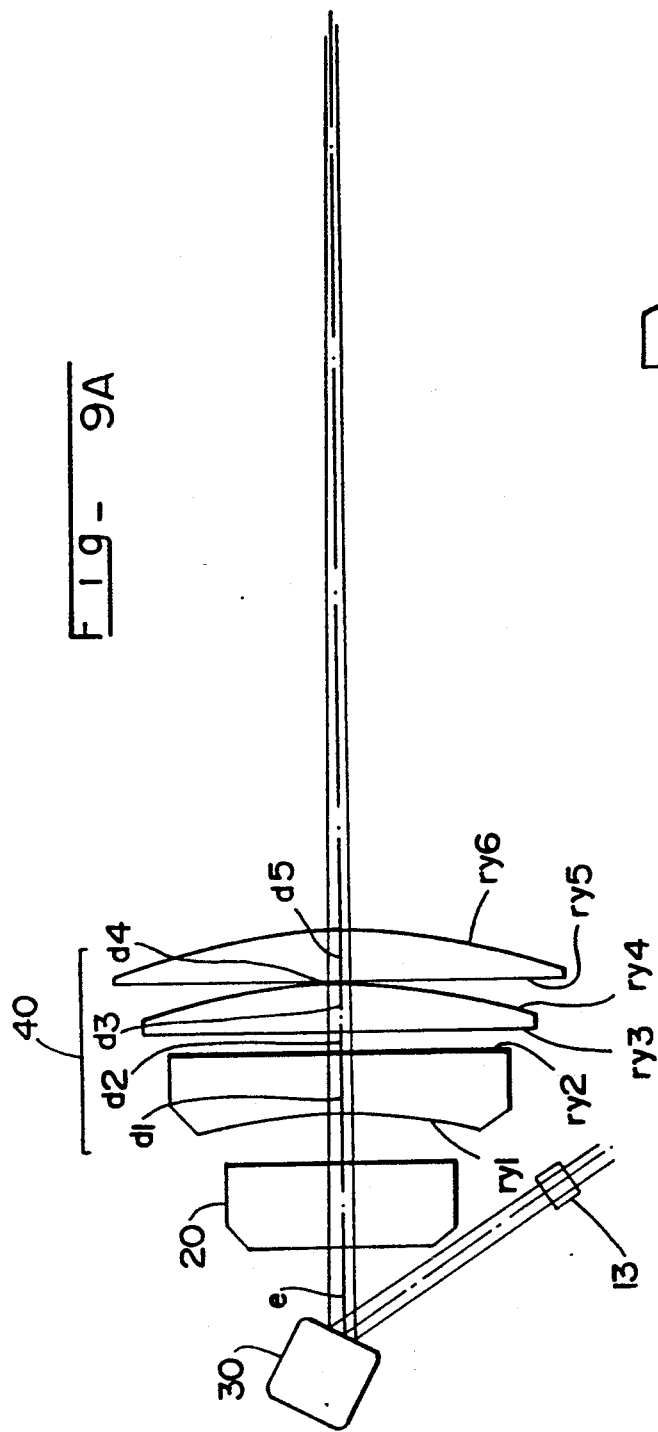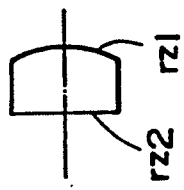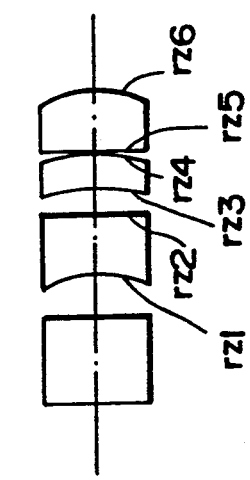

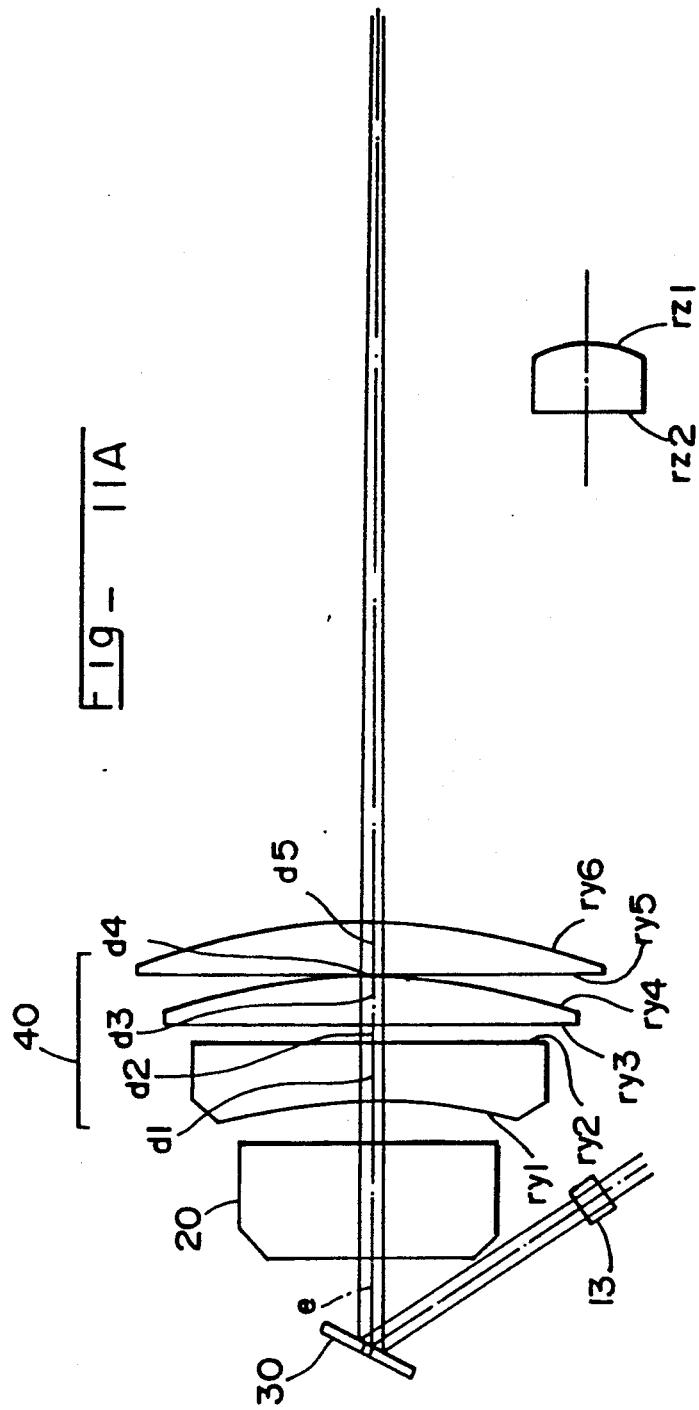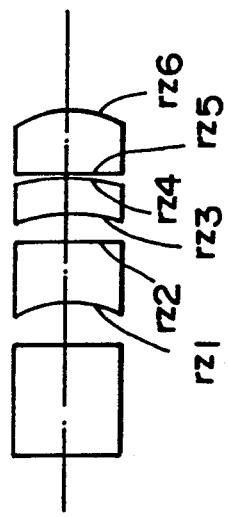

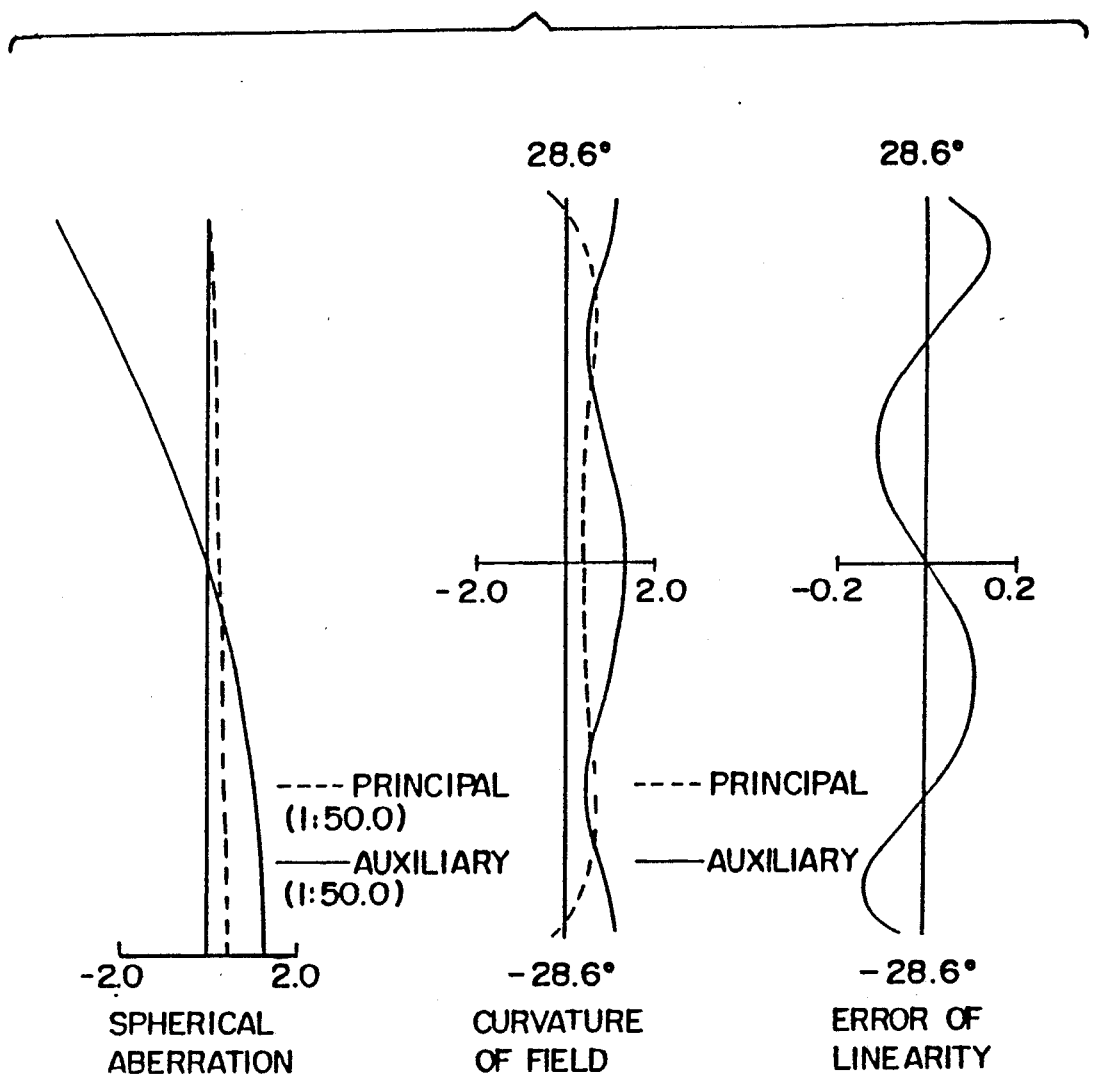

SCANNING OPTICAL SYSTEM

BACKGROUND OF THE INVENTION

1. Field of the Invention

The present invention relates to a scanning optical system for scanning a laser beam on a scanning surface to form a pattern thereon, and particularly to a system to be able to reduce a curvature of field.

2. Description of the Prior Art

Japanese Patent Early Laid-Open Publication No. Sho 63-146015 discloses a scanning optical system having an anamorphic optical system. A laser beam emitted from a light source is imaged on reflecting surfaces of the polygon mirror in an auxiliary scanning plane by the anamorphic optical system so as to correct an affection caused by a tilting error of the reflecting surface used as a deflector.

Since the optical system of the Japanese publication cited above has a large positive power in the auxiliary scanning direction in order to temporarily image the light beam on the reflecting surface, a focusing point of the laser beam approaches the fθ lens. In order to correct the curvature of field, a cylinder surface or toric surface having a negative curvature in the auxiliary scanning plane may be used for other lenses.

Also, in an optical system which provides a polygon mirror as a scanning deflector, since a radius of the polygon mirror is made relatively large, the curvature of field is corrected by a change of the deflecting point of the polygon mirror. If the number of the reflecting surfaces is fixed, the amount of the change of the deflecting point is varied by the radius of the polygon mirror.

However, if the negative power in the auxiliary scanning direction is made strong, it is possible indeed to favorably correct the curvature of field, but the wave aberration in the skew direction is deteriorated, thus resulting in a degraded spot shape.

Also, in case of a general scanning optical system such as a system of a laser beam printer, since the laser beam is incident to the polygon mirror from a direction from the optical axis of the scanning lens, a deflecting point on the reflecting surface of the polygon mirror changes asymmetrically about the optical axis. Therefore, a problem occurs such that the curvature of field become asymmetric on the scanning surface and correction can not be made when a lens is symmetric about the optical axis. As the radius becomes larger the curvature of field becomes smaller. Also, as the radius become larger the asymmetry also becomes larger.

In particular, such a problem conspicuously appears in a system having high accuracy and wide scanning extent.

For example, in such an apparatus as laser processing which requires such high accuracy in dot density, for example, 1000 dpi or more, a lens system having an F number of about 1:25~1:35 is required in order to reduce the spot diameter to about 30 μm and deterioration of the quality of an image caused by wave aberration in the skew direction becomes significant.

Also, for laser processing devices used for printing posters, there are some devices which have a scanning extent of 600 mm or more.

Since the focal length of the lens system becomes long, it was very difficult to favorably correct the wave front aberration and to correct the curvature of field.

SUMMARY OF THE INVENTION

The present invention has been accomplished to solve the above-mentioned problems. It is therefore an object of the invention to provide a scanning optical system which corrects the curvature of field, while the negative power of the cylinder surface or toric surface and the change deflecting point are reduced.

A scanning optical system, according to the present invention, comprises a laser light source, a scanning deflector for deflecting a laser beam from the laser light source, a scanning lens for focusing deflected light on a scanning surface, a focusing point-changing element for changing a focusing point so that a curvature of field is reduced.

BRIEF DESCRIPTION OF THE DRAWINGS

FIG. 4 shows aberration diagrams of the first embodiment;

FIGS. 9(a), 9(b), and 9(c) are diagrams of a principal scanning plane and an auxiliary scanning plane, respectively, according to a fifth embodiment;

FIGS. 11(a), 11(b), and 11(c) are diagrams of the principal scanning and an auxiliary scanning plane of the sixth embodiment; and FIG. 12 are aberration diagrams of the sixth embodiment.

DETAILED DESCRIPTION OF THE PREFERRED EMBODIMENTS

Figure 1:
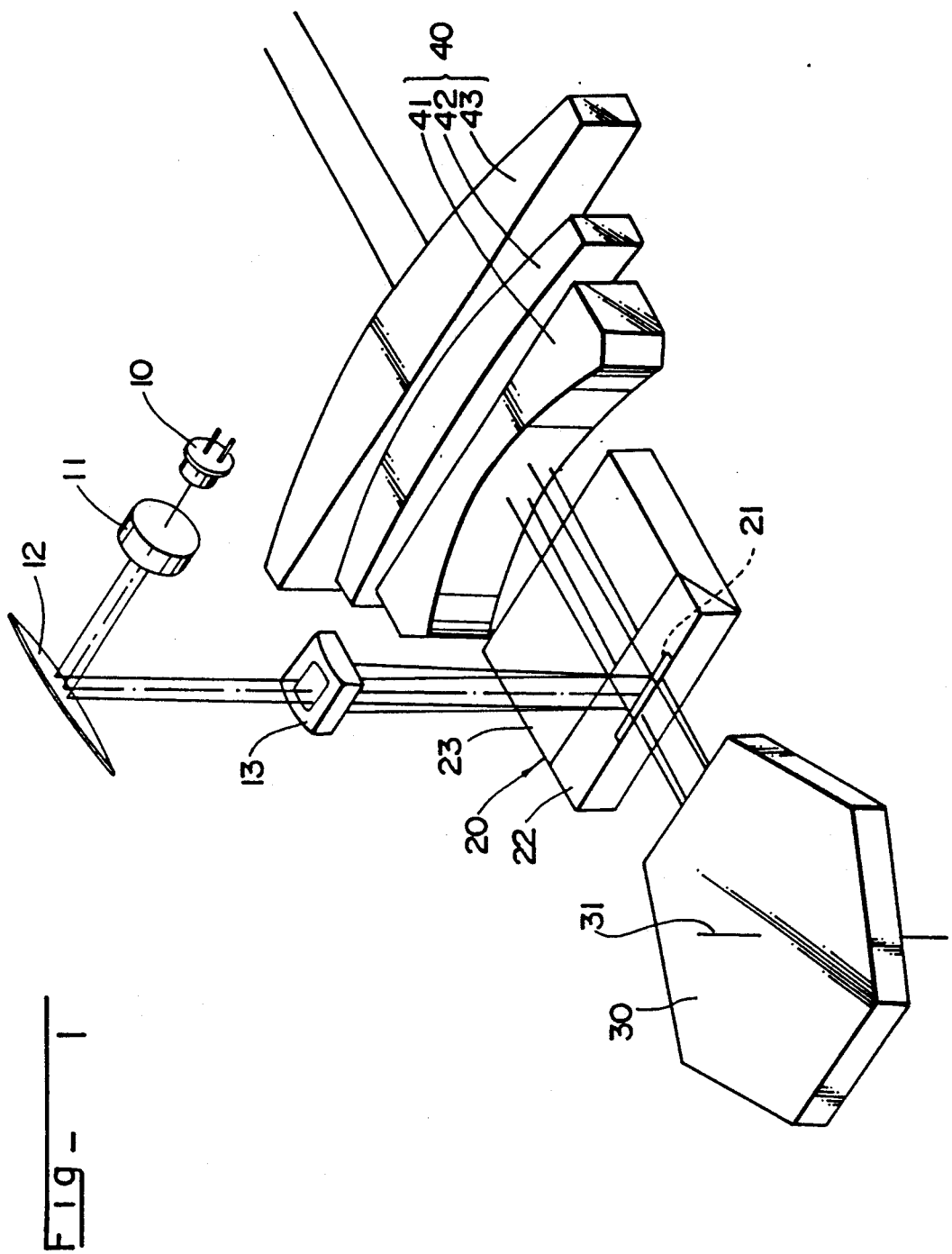
FIG. 1 is a perspective view of a scanning optical apparatus illustrating a first embodiment of the present invention.

The embodiment of the present invention will now be described hereinafter with references to the drawings.

First embodiment

First, an arrangement of optical elements of the apparatus will be described with reference to FIG. 1.

The illustrated optical system includes a semiconductor laser 10 as a light source, a collimator lens 11 for collimating a divergent light which is emitted by the semiconductor laser 10, a mirror 12 for reflecting the collimated laser beam, a cylindrical lens 13 acting as an imaging lens for imaging the collimated light beam into a line spread function image, a prism block 20 acting as a focusing point changing element, a slit mirror 21 which is disposed in the prism block 20 and is coincident with the line spread function image, a polygon mirror 30 acting as a scanning deflector for reflecting and deflecting a light beam reflected by the slit mirror 21, and an anamorphic fΘ lens 40 acting as a scanning lens for focusing a reflected light beam by the polygon mirror 30 on a scanning surface in order to form a spot image thereon. The light source and the scanning deflector (i.e., the laser 10 and polygon mirror 30) are arranged so that a deflecting point on the scanning deflector is symmetrically changed about an optical axis of the scanning lens. Further, it can also be arranged that the light source and the scanning deflector are arranged so that a deflecting point on the scanning deflector is fixed.

For the purpose of easy understanding, in the description to follow, a plane on which a light beam is scanned by the polygon mirror 30 is referred to as a "principal scanning plane", while a plane perpendicular to the principal scanning plane and including an optical axis of the scanning lens is referred to as an "auxiliary scanning plane".

The prism block 20 has a rectangular parallelepiped shape formed of a triangular prism 22 and a trapezoidal prism 23 cemented together. A slit mirror 21 acting as a total reflection mirror is made by using vacuum evaporation technology. The angle of the slit mirror 21 with respect to the principal scanning plane is approximately 45°.

The divergent light emitted from the semiconductor laser 10 is collimated and then imaged as a line spread function image perpendicular to the auxiliary scanning plane by the cylindrical lens 13. Since the slit mirror 21 is disposed in such a manner as to be coincident with this line spread function image, the light beam from the light source is imaged on the slit mirror 21 and at the same time, the total quantity of the light is reflected by this slit mirror 21 and advances to the polygon mirror 30 along the optical axis of the fΘ lens 40.

The light beam reflected and deflected by the polygon mirror 30 reaches the prism block 20 with a certain degree of spreading. Most of the light beam is incident to the fΘ lens 40 after passing through the surrounding portion of the slit mirror 21 and forms a spot on a scanning surface (not shown).

The slit mirror 21 has no change of transmittance caused by change of angle of rotation of the polygon mirror 30 and has no change of spot intensity caused by the image height on the scanning surface. In this specification, the term "image height" means a distance from the optical axis. If a polarizing beam splitter is used instead of the prism 20, the transmittance is gradually changed as it goes toward the peripheral portion from the central portion and irregularity of light quantity occurs on the scanning surface.

Figure 2:
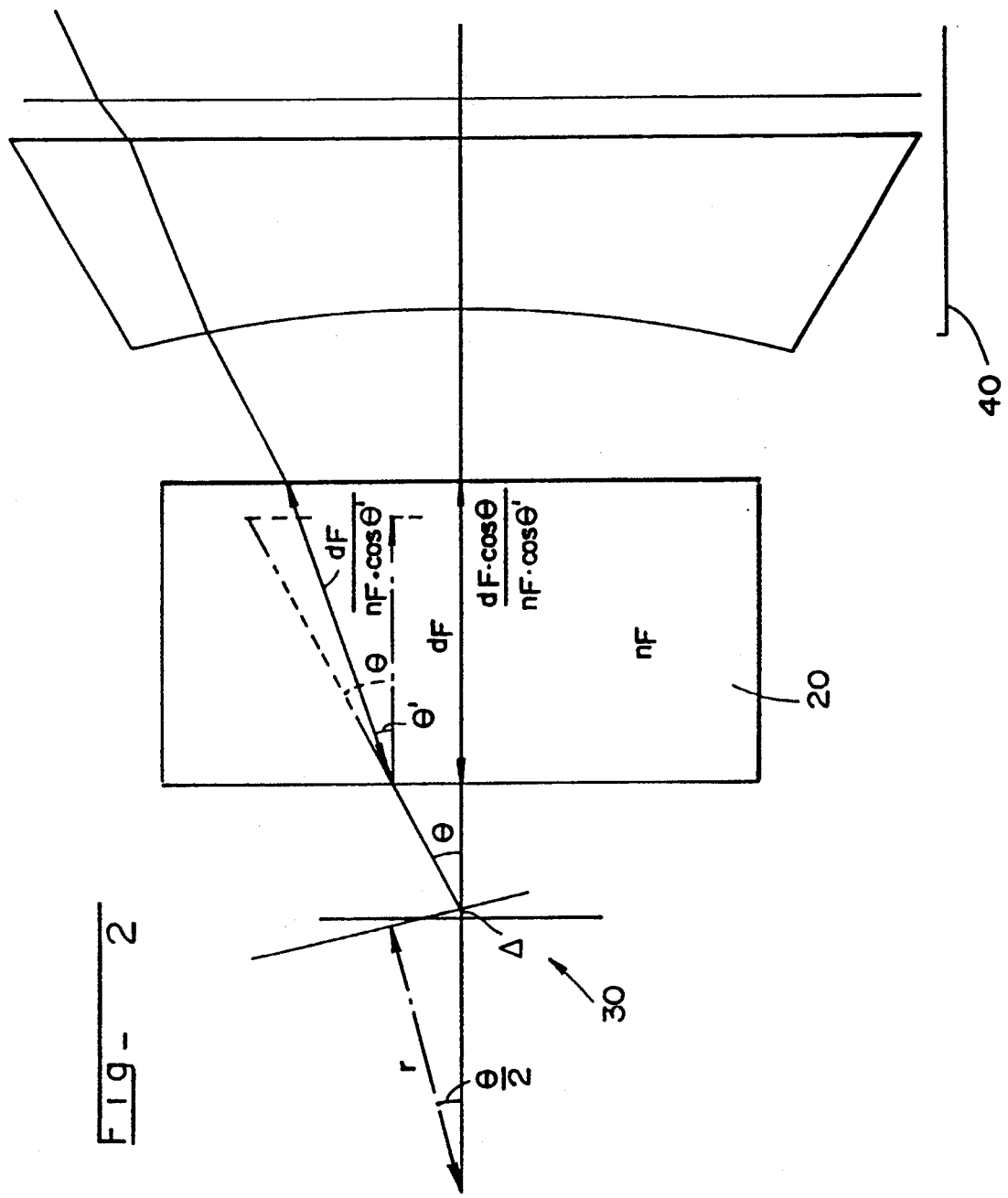
FIG. 2 is a schematic view explaining the operation of a focusing point changing element of the present invention.

Next, the principal concerning the change of the deflecting point of the polygon mirror 30 and this shift of the focusing point caused by the prism block 20 will be described with reference to FIG. 2. In FIG. 2, a ray advancing through the optical axis of the fΘ lens is shown.

When a reflected light beam from the polygon mirror 30 has a scanning angle Θ with respect to the optical axis of the fΘ lens, the polygon mirror is rotated by Θ/2 with reference to a state where the reflecting surface of the polygon mirror is perpendicular to the optical axis.

At this time, the point of intersection between the reflecting surface and the incident beam is shifted from a reference deflection point in a state where the reflecting surface is perpendicular to the optical axis, by the following amount $\Delta$:

$$\Delta = r \cdot \left( \frac{1}{\cos(\Theta/2)} - 1 \right)$$

wherein r is the inscribed circle radius. The object distance becomes shortened in the optical axis direction by the following amount S1 compared with a case where the defection point is not changed:

$$S1 = \Delta \cdot (1 + \cos\Theta)$$

In order to obtain the effect of correction of the curvature of field caused by the change of deflection point of the polygon mirror, it is desirable to satisfy the condition $r > 0.05 fy$, wherein r is the inscribed circle radius of the polygon mirror, and fy is the focal length of the fΘ lens in the principal scanning direction.

The condition is effective for only the embodiment of FIG. 1.

The light beam toward the fΘ lens from the polygon mirror is parallel light in the principal scanning plane but a divergent light beam in the auxiliary scanning plane. Because of the foregoing reason, the prism block 20 located in the optical path does not act on the light beam in the principal scanning plane and acts on the light beam in such a manner as to move the focal point depending on the angle of incidence in the auxiliary scanning plane.

An optical path length of a plane parallel plate having a refractive index n and a thickness d is able to be converted to a distance d/n, equivalent to a distance d in air. Therefore, there occurs a movement of the focal point by $(d \cdot (n-1))/n$ between a case where the plane parallel plate is inserted in an optical path of a converging or divergent light and a case where the plane parallel plate is not inserted.

Similarly, when the prism block 20 acting as a plane parallel plate having a thickness dF in the optical axis direction is located between the polygon mirror and the fΘ lens, an air converted distance of the beam passing through the prism block 20 is dF/nF (wherein nF is the refractive index of the prism block) with reference to the light beam on the axis.

On the other hand, as the light beam outside the axis is a sagittal light beam (i.e., shaped like an arrowhead), an air converted distance in the prism block is changed by portion equal to the refractive index. An air converted distance of the refracted beam in the prism block becomes $$dF / (nF \cdot \cos\Theta')$$

wherein the refractive angle is $\Theta'$. The relationship between $\Theta$ and $\Theta'$ is defined as $nF \cdot \sin\Theta' = \sin\Theta$.

The beam which is made incident to the prism block at an angle Θ travels the same distance at an angle Θ as shown by the broken line if the prism block is not provided there. When the beam shown by the broken lines is projected to the optical axis, the length thereof becomes as follows:

$$(dF \cdot \cos\Theta) / nF \cdot \cos\Theta'$$

Therefore, an optical path shortened amount by the prism block S2 with respect to the beam on the optical axis becomes as follows:

$$S2 = (dF/nF)(1-(\cos\Theta/\cos\Theta'))$$

and the object distance of the peripheral portion is shortened by S2.

That is, this indicates that the focusing point formed by the beam having the scanning angle $\Theta$ is shifted by $S1+S2$ for the beam traveling direction as compared with the focusing point formed by the beam on the optical axis. Thus, the focusing point changing element 20 serves to bring the focusing point in a peripheral portion of the scanning surface closer to the scanning lens, as compared to a focusing point in a central portion of the scanning surface.

Therefore, the peripheral curvature of field is improved by approximately;

$$mz^2(S1+S2)$$

wherein the power of the f$\Theta$ lens system in the auxiliary scanning plane is mz.

Also, in order to favorably correct the curvature of field it is desirable to satisfy the following condition;

$$0.05fy < mz^2(S1+S2) < 0.15fy$$

If the curvature of field is lower than the lower limit, the change of the object distance caused by the polygon mirror and the focusing point changing element is small and a sufficient correcting effect of the curvature of field is unobtainable. If the shortage of correction is compensated by increasing the negative power in the auxiliary scanning direction, the wave aberration deteriorates.

On the contrary, if it exceeds the highest limit, the effect caused by the polygon mirror and the focusing point changing element becomes excessive and the polygon mirror and the focusing point changing element become impracticably large.

Figure 3A:
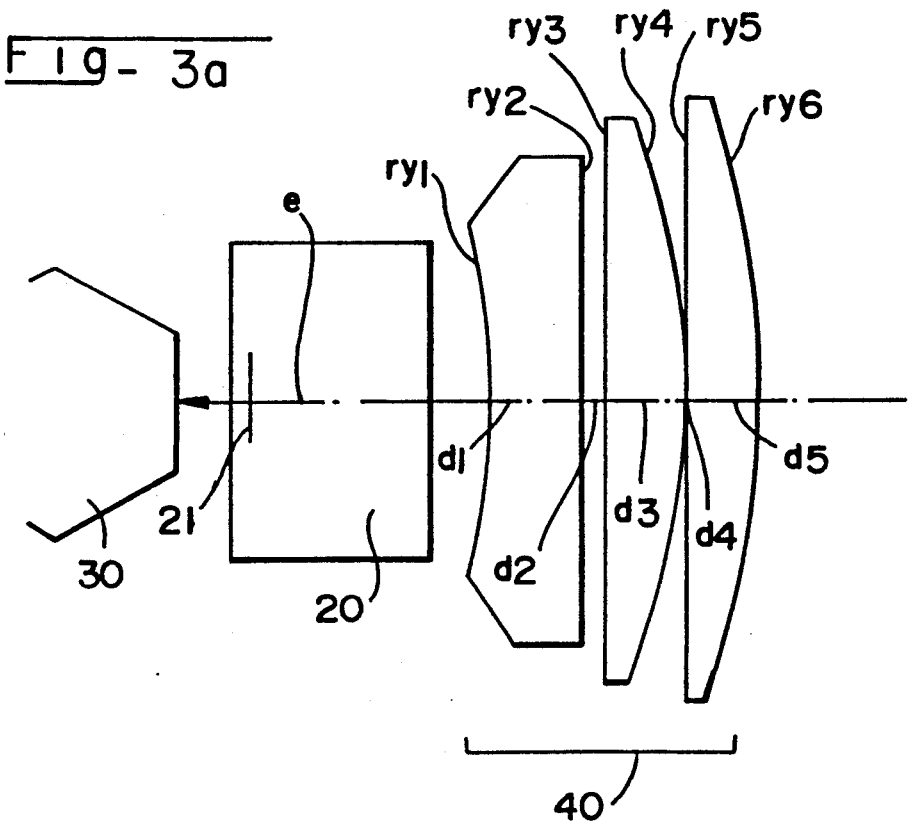
FIGS. 3(a) and 3(b) are diagrams of a principal scanning surface and an auxiliary scanning surface, respectively, according to the first embodiment.
Figure 3B:
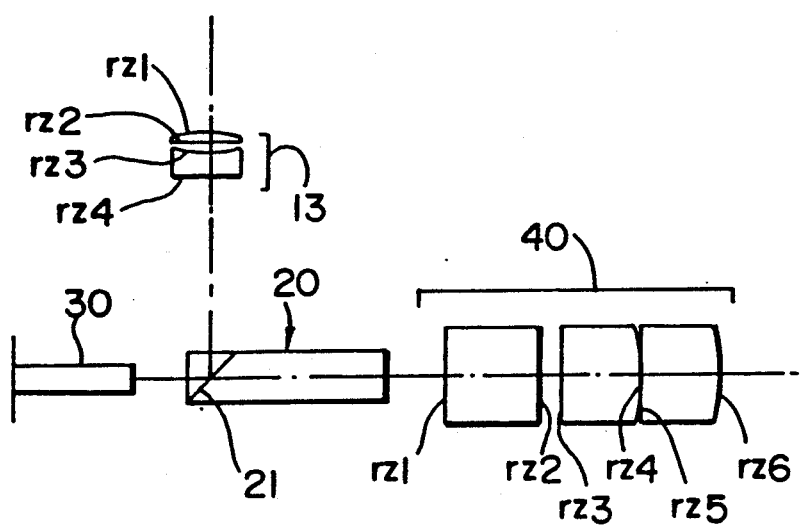

Next, specific numeric examples of the first embodiment will be described. FIGS. 3(a) and 3(b) show the optical system of the first embodiment in the principal and auxiliary scanning plane for explaining the numeric values.

Table 1 and Table 2 show the numeric construction of the first embodiment, Table 1 shows the numeric construction of the cylinder lens and Table 2 shows the construction of the f$\Theta$ lens. This example is suitable for a case where the semiconductor laser of a wavelength $\lambda=780$ nm is used.

In the tables, the symbolic characters ry denote the radius of curvature in the principal scanning plane, rz the radius of curvature in the auxiliary scanning plane, fc the focal length of the cylinder lens in the auxiliary scanning, fy the focal length of the f$\Theta$ lens in the principal scanning plane, and mz the lateral magnification in the auxiliary scanning plane of the f$\Theta$ lens.

The aberration due to the construction of the first embodiment is as shown in FIG. 4. In this optical system, in order to balance the aberration, the actual image point is displaced from the paraxial image point in the principal and auxiliary scanning directions. And in the spherical aberration diagram of FIG. 5, numeric values including such displacement of the image point are shown.

TABLE 1

| surface No. | ry | rz | d | n |
|---|---|---|---|---|
| | | fc = 100.61 | | |
| 1 | ∞ | 21.0 | 10.00 | 1.51072 |
| 2 | ∞ | ∞ | 2.08 | |
| 3 | ∞ | −28.0 | 8.00 | 1.51072 |
| 4 | ∞ | ∞ | | |

Distance from the final surface to the line spread function image:

L1 = 74.03 mm

Air converted distance from the line spread function image to the reference deflection point: L2 = 28.05
Inscribed radius of the polygon mirror: r = 49
Focusing point movement caused by the polygon mirror:

S1 = 2.78

Prism block
Thickness dF = 83.6 Refractive index: nF = 1.51072
Focusing point movement caused by the prism: S2 = 3.87
Distance from the reference deflection point to the first surface of the f$\Theta$ lens including the prism block: e = 129.59

TABLE 2

| surface No. | ry | rz | d | n |
|---|---|---|---|---|
| | fy = 659.63 mz = 3.02 mz²(S1 + S2) ≈ 0.092 fy | | | |
| 1 | −280.0 | −280.0 | 39.64 | 1.71230 |
| 2 | ∞ | 190.0 | 10.56 | |
| 3 | −3770.306 | −3770.306 | 31.21 | 1.51072 |
| 4 | −315.0 | −315.0 | 1.00 | |
| 5 | ∞ | ∞ | 32.00 | 1.71230 |
| 6 | −350.0 | −93.3 | | |

Distance from the final surface to the scanning surface: fb = 763.23

Moreover, at least one of the incident and outgoing surfaces can be formed as a curved surface in order to prevent generation of ghosts by the prism block 20.

Second embodiment

Table 3 and Table 4 show the second embodiment of the present invention. Table 3 shows the construction of the cylinder lens and Table 4 shows the construction of the f$\Theta$ lens. This embodiment is suitable for a case where a He-Ne laser of a wavelength $\lambda=632.8$ nm is used as a light source instead of the semiconductor laser.

As the arrangement of the optical elements is similar to the first embodiment, it is not shown in the figures.

Figure 5:
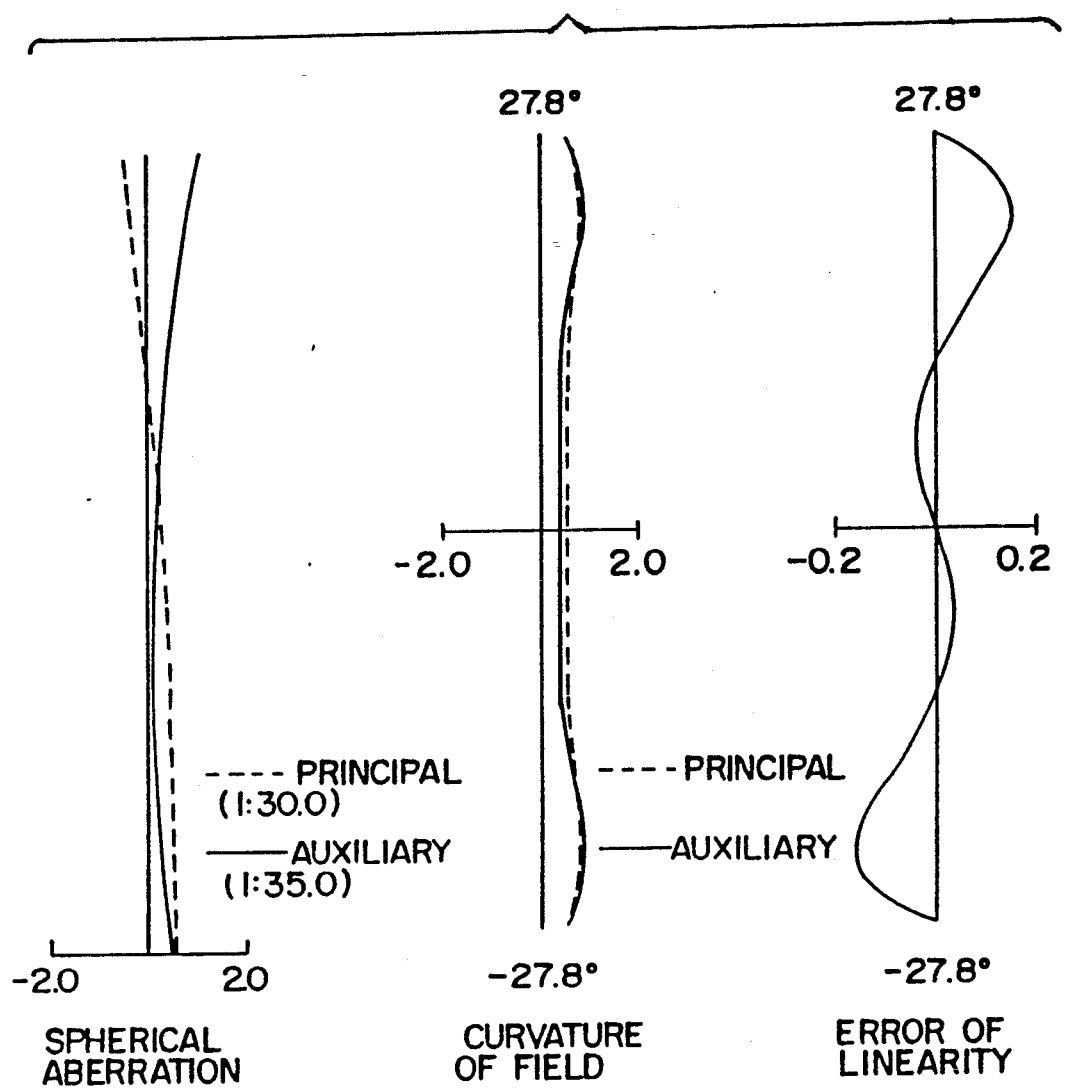
FIG. 5 shows aberration diagrams of the second embodiment.

The aberration caused by the construction of the second embodiment is as shown in FIG. 5.

TABLE 3

| surface No. | ry | rz | d | n |
|---|---|---|---|---|
| | | fc = 99.63 | | |
| 1 | ∞ | 21.0 | 10.00 | 1.51462 |
| 2 | ∞ | ∞ | 2.08 | |
| 3 | ∞ | −28.0 | 8.00 | 1.51462 |
| 4 | ∞ | ∞ | | |

Distance from the final surface to the line spread function image: L1=73.15 mm
Air converted distance from the line spread function image to the reference deflection point: L2=27.42
Inscribed radius of the polygon mirror: r=49
Focusing point movement caused by the polygon mirror: S1=2.78
Prism block
Thickness: dF=83.6 Refractive index: nF=1.51462
Focusing point movement caused by the prism: S2=3.87
Distance from the reference deflection point to the first surface of the fΘ lens including the prism block: e=130.72

TABLE 4

$f_y = 659.92$ mz $= 3.09$ mz$^2$(S1 + S2) $\approx 0.096 f_y$

| surface No. | ry | rz | d | n |
|---|---|---|---|---|
| 1 | −285.0 | −285.0 | 39.64 | 1.72309 |
| 2 | ∞ | 190.0 | 10.66 | |
| 3 | −3421.511 | −3421.511 | 31.77 | 1.51462 |
| 4 | −322.800 | −322.800 | 1.00 | |
| 5 | ∞ | ∞ | 32.00 | 1.72309 |
| 6 | −350.0 | −94.4 | | |

Distance from the final surface to the scanning surface: fb=764.47

Third embodiment

Figure 6A:
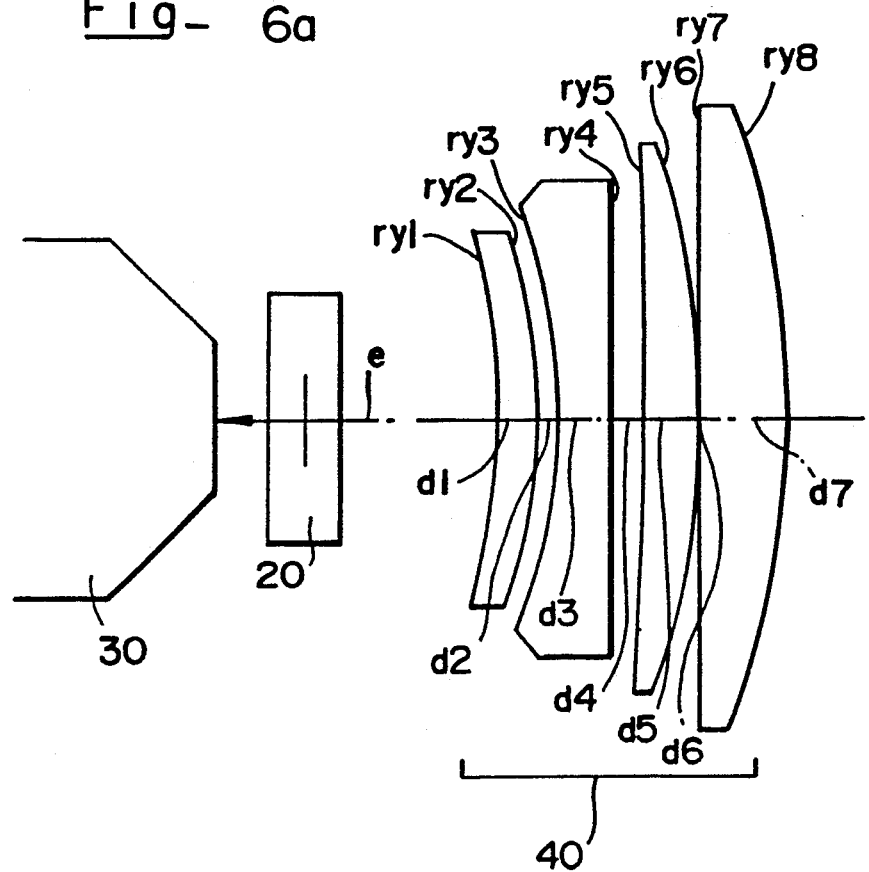
FIGS. 6(a) and 6(b) are diagrams of a principal scanning surface and an auxiliary scanning surface, respectively, according to the third embodiment.
Figure 6B:
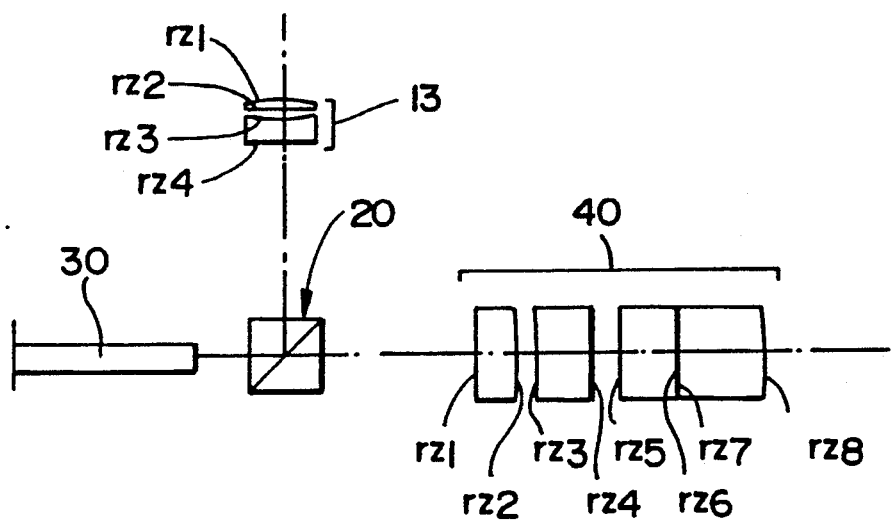

FIGS. 6(a) and 6(b) show an arrangement of the optical element of a third embodiment according to the present invention. FIG. 6(a) shows the principal scanning plane and FIG. 6(b) shows the auxiliary scanning plane. In this embodiment, the prism block 20 is formed by two triangular pole (or bar) prisms 22 and 23 cemented together.

Table 5 and Table 6 show third embodiment. Table 5 shows the construction of the cylinder lens and Table 6 shows the construction of the fΘ lens. This example is suitable for a case where the semiconductor laser of a wavelength λ=780 nm is used.

Figure 7:
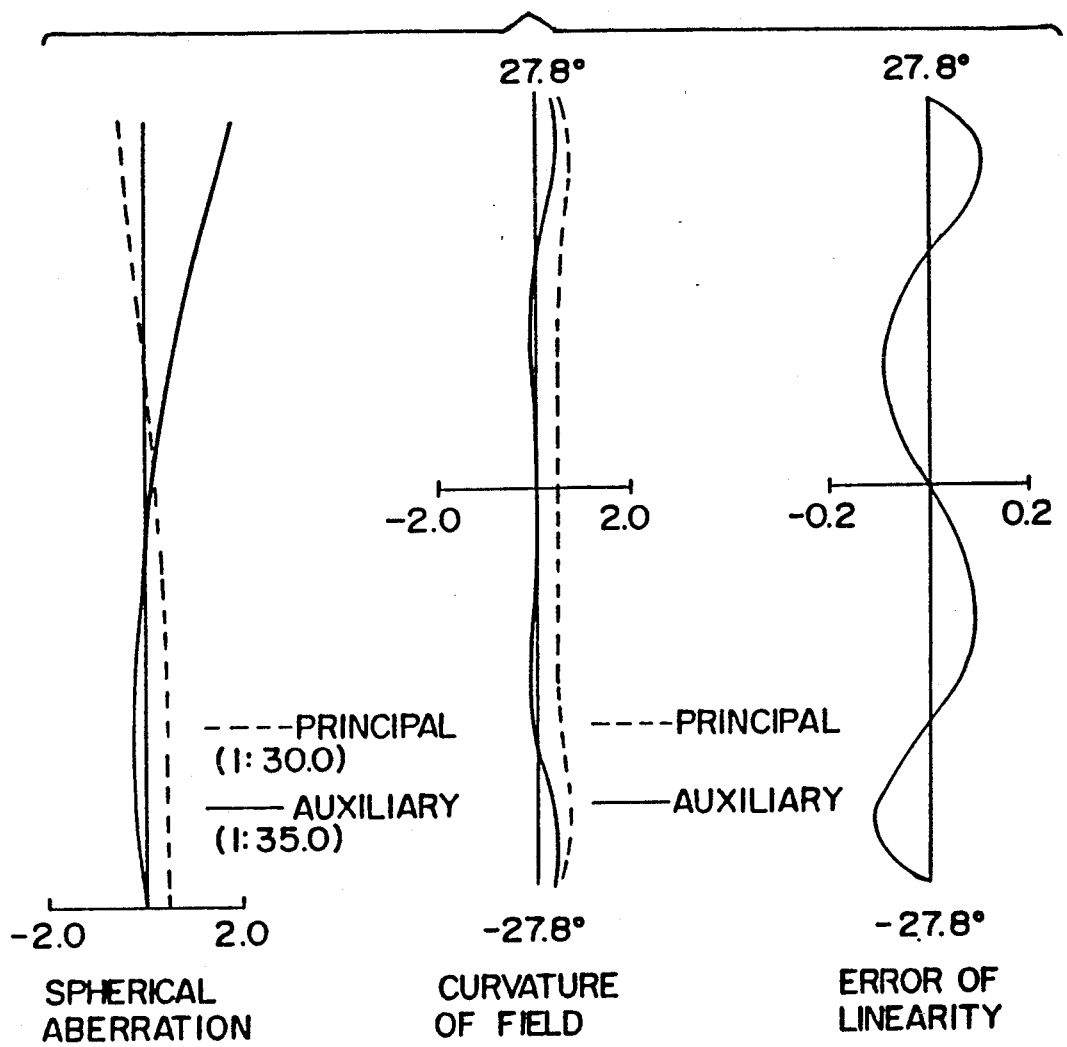
FIG. 7 are aberration diagrams of the third embodiment.

Aberration caused by the construction of the third embodiment is as shown in FIG. 7.

TABLE 5

$f_c = 100.02$

| surface No. | ry | rz | d | n |
|---|---|---|---|---|
| 1 | ∞ | 20.8 | 8.00 | 1.51072 |
| 2 | ∞ | ∞ | 1.19 | |
| 3 | ∞ | −29.5 | 6.00 | 1.51072 |
| 4 | ∞ | ∞ | | |

Distance from the final surface to the line spread function image: L1=80.12 mm
Air converted distance from the line spread function image to the reference deflection point: L2=29.96
Inscribed radius of the polygon mirror: r=75
Focusing point movement caused by the polygon mirror: S1=4.26
Prism block
Thickness: dF=30.0 Refractive index: nF=1.76591
Focusing point movement caused by the prism: S2=1.41
Distance from the reference deflection point to the surface of the fΘ lens including the prism block: e=118.35

Distance from the final surface to the scanning surface: fb=751.26

TABLE 6

$f_y = 659.33$ mz $= 2.84$ mz$^2$(S1 + S2) $\approx 0.069 f_y$

| surface No. | ry | rz | d | n |
|---|---|---|---|---|
| 1 | −288.139 | −288.139 | 17.66 | 1.76591 |
| 2 | −234.0 | −234.0 | 8.38 | |
| 3 | −236.0 | −236.0 | 22.44 | 1.71230 |
| 4 | ∞ | 215.0 | 12.84 | |
| 5 | −3236.220 | −3236.220 | 23.66 | 1.51072 |
| 6 | −328.301 | −328.301 | 1.00 | |
| 7 | ∞ | ∞ | 36.10 | 1.71230 |
| 8 | −350.0 | −96.7 | | |

Fourth embodiment

Table 7 and Table 8 show the fourth embodiment of the present invention. Table 7 shows the construction of the cylindrical lens and Table 8 shows the construction of the fΘ lens. This example is suitable for a case where an He-Ne laser of a wavelength λ=632.8 nm is used as a light source.

As the arrangement of the optical elements is similar to the first embodiment, it is not shown in the figures.

Figure 8:
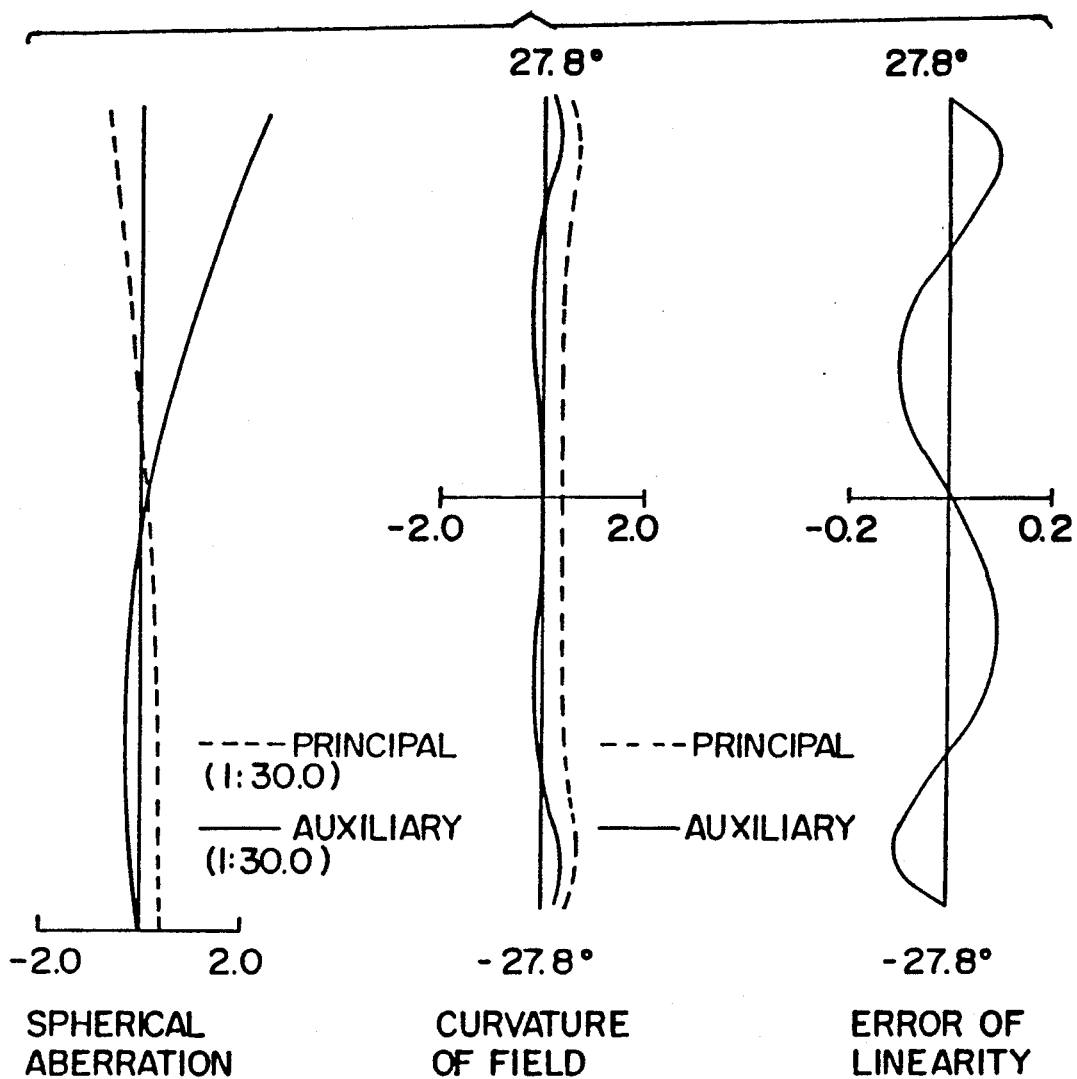
FIG. 8 are aberration diagrams of the fourth embodiment.

Aberration caused by the construction of the fourth embodiment is as shown in FIG. 8.

TABLE 7

$f_c = 99.11$

| surface No. | ry | rz | d | n |
|---|---|---|---|---|
| 1 | ∞ | 20.8 | 8.00 | 1.51462 |
| 2 | ∞ | ∞ | 1.19 | |
| 3 | ∞ | −29.5 | 6.00 | 1.51462 |
| 4 | ∞ | ∞ | | |

Distance from final surface to the line spread function image: L1=79.28 mm
Air converted distance from the line spread function image to the reference deflection point: L2=29.96
Inscribed radius of the polygon mirror: r=75
Focusing point movement caused by the polygon mirror: S1=4.26
Prism block
Thickness: dF=30.0 Refractive index: nF=1.77861
Focusing point movement caused by the prism: S2=1.40
Distance from the reference deflection point to the first surface of the fΘ including the prism block: e=116.43

TABLE 8

$f_y = 659.42$ mz $= 2.87$ mz$^2$(S1 + S2) $\approx 0.071 f_y$

| No. | ry | rz | d | n |
|---|---|---|---|---|
| 1 | −282.196 | −282.196 | 18.89 | 1.77861 |
| 2 | −231.100 | −231.100 | 8.45 | |
| 3 | −238.573 | −238.573 | 22.56 | 1.72309 |
| 4 | ∞ | 215.0 | 12.62 | |
| 5 | −3146.0 | −3146.0 | 23.02 | 1.51462 |
| 6 | −334.8 | −334.8 | 0.97 | |
| 7 | ∞ | ∞ | 36.26 | 1.72309 |
| 8 | −350.16 | −97.0 | | |

Distance from the final surface to the scanning surface: fb=752.86

Fifth embodiment

FIG. 9(a) is a principal scanning plane diagram showing the fifth embodiment of the present invention.

In this embodiment, a laser light beam emitted from a light source becomes incident onto the polygon mirror 30. The incident laser beam forms a predetermined angle between the optical axis of the fΘ lens 40 in the principal scanning plane. Therefore, the deflecting point changes asymmetrically. Also, since the polygon mirror 30 having 4 reflecting surfaces has a smaller radius than the above-mentioned embodiments, it makes the change of deflecting point small. The prism block 20 makes a large correcting effect in the field of curvature.

Figure 10:
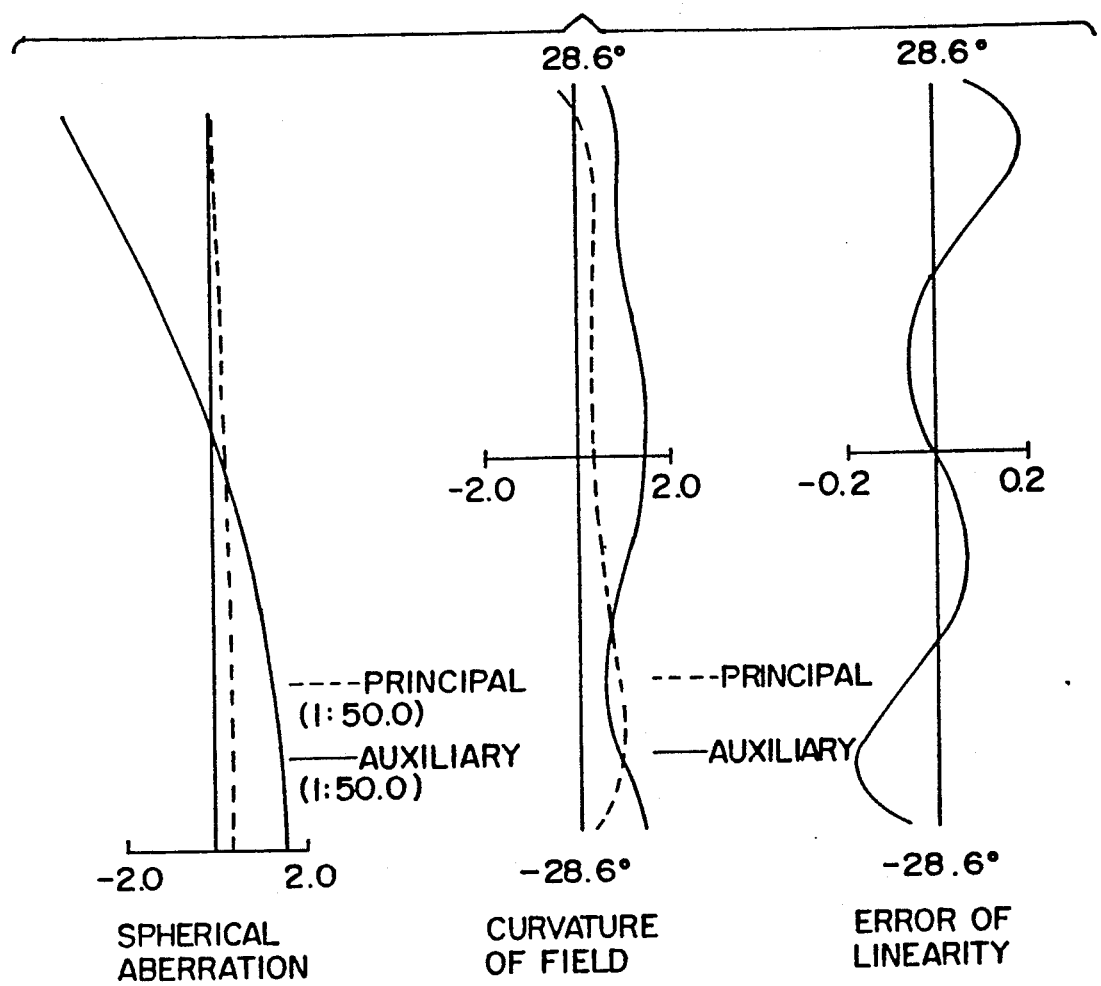
FIG. 10 are aberration diagrams of the fifth embodiment.

Table 9 and Table 10 show the fifth embodiment. Table 9 shows the construction of the fΘ lens. Aberration caused by the construction of the fifth embodiment is shown in FIG. 10.

TABLE 9

$fc = 117.48$

| surface No. | ry | rz | d | n |
|---|---|---|---|---|
| 1 | ∞ | 60.0 | 15.00 | 1.51072 |
| 2 | ∞ | ∞ | | |

Distance from the final surface to the line spread function image: L1=107.55 mm
Air converted distance from the line spread function image to the reference deflection point: L2=29.25 mm
Inscribed radius of the polygon mirror: r=25
Angle formed between the incident light and the optical axis of the fΘ lens: w=−55°
Focusing point movement caused by the polygon mirror: S1=1.51
Prism block
Thickness: dF=50.0 Refractive index: nF=1.51072
Focusing point movement caused by the prism: S2=2.47
Distance from the reference deflection point to the first surface of the fΘ lens including the prism block: e=128.07

TABLE 10

$fy = 599.60 \; mz = 2.67 \; mz^2(S1 + S2) \approx 0.047 \; fy$

| surface No. | ry | rz | d | n |
|---|---|---|---|---|
| 1 | −280.000 | −280.000 | 34.60 | 1.71230 |
| 2 | ∞ | −201.400 | 12.33 | |
| 3 | −2444.907 | −2444.907 | 26.10 | 1.51072 |
| 4 | −313.650 | −313.650 | 2.03 | |
| 5 | ∞ | ∞ | 29.30 | 1.71230 |
| 6 | −315.000 | −92.300 | | |

Distance from the final surface to the scanning surface: fb=688.19

Sixth embodiment

FIGS. 11(a)-11(c) are principal scanning plane diagrams showing the sixth embodiment of the present invention.

In this embodiment, a plate mirror 30' which has mirror surface on both sides is provided as the scanning deflector. An inscribed radius of the plate mirror 30 is almost infinite.

A laser light beam emitted from a light source makes incident at the rotating axis of the mirror 30. Therefore, if the thickness of the plate mirror 30 can be left out of consideration, the deflecting point usually coincides with the rotational axis, and appearance of the curvature of field becomes symmetric.

Table 11 and Table 12 show the fifth embodiment, Table 11 shows the construction of the cylindrical lens and Table 12 shows the construction of the fΘ lens. Aberration caused by the construction of the sixth embodiment is as shown in FIG. 12.

TABLE 11

$fc = 117.48$

| surface No. | ry | rz | d | n |
|---|---|---|---|---|
| 1 | ∞ | 60.0 | 15.00 | 1.51072 |
| 2 | ∞ | ∞ | | |

Distance from the final surface to the line spread function image: L1=107.55 mm
Air converted distance from the line spread function image to the reference deflection point: L2=28.65 mm
Inscribed radius of the polygon mirror: r=0
Angle formed between the incident light and the optical axis of the fΘ lens: w=−55°
Focusing point movement caused by the polygon mirror: S1=0
Prism block
Thickness: dF=65.60 Refractive index: nF=1.51072
Focusing point movement caused by the prism: S2=3.24
Distance from the reference deflection point to the first surface of the fΘ lens including the prism block: e=140.36

TABLE 12

$fy = 599.22 \; mz = 2.61 \; mz^2(S1 + S2) \approx 0.037 \; fy$

| surface No. | ry | rz | d | n |
|---|---|---|---|---|
| 1 | −278.000 | −278.000 | 31.64 | 1.71230 |
| 2 | ∞ | −202.000 | 12.36 | |
| 3 | −2444.907 | −2444.907 | 25.22 | 1.51072 |
| 4 | −307.260 | −307.260 | 2.11 | |
| 7 | ∞ | ∞ | 29.77 | 1.71230 |
| 8 | −315.000 | −92.400 | | |

Distance from the final surface to the scanning surface: fb=684.76

As mentioned above, since curvature of field is corrected by the focusing point changing element, it is not always necessary that the curvature of field is corrected by the changing of the deflecting point, and even in the case of the radius of the polygon mirror is small, the curvature of the field can be corrected. Therefore, the asymmetry of the curvature of field is reduced, and at the same time, the curvature of field is reduced.

What is claimed is:

1. A scanning optical system comprising:
   a laser light source;
   a scanning deflector for deflecting a laser beam from said laser light source;
   a scanning lens for focusing deflected light on a scanning surface; and
   a focusing point changing element, having substantially no power, for changing a focusing point so that a curvature of field is reduced, said focusing point changing element being disposed between said scanning deflector and said scanning lens.

2. A scanning optical system according to claim 1, wherein said focusing point changing element brings a focusing point in a peripheral portion of said scanning surface near to said scanning lens as compared with a focusing point in the central portion of said scanning surface.

3. A scanning optical system according to claim 1, wherein said focusing point changing element changes the focusing point in an auxiliary scanning plane.

4. A scanning optical system according to claim 1, wherein said light source and said scanning deflector are so arranged that a deflecting point on the scanning deflector is asymmetrically changed about an optical axis of said scanning lens.

5. A scanning optical system according to claim 1, wherein said light source and said scanning deflector are arranged so that an axis of a laser light beam which becomes incident onto said scanning deflector forms a predetermined angle with an optical axis of said scanning lens in a principal scanning plane.

6. A scanning optical system according to claim 1, wherein said light source and said scanning deflector are arranged so that a deflecting point on the scanning deflector is symmetrically changed about an optical axis of said scanning lens.

7. A scanning optical system according to claim 1, wherein said light source and said scanning deflector are arranged so that the laser beam becomes incident unto said scanning deflector along an optical axis of said scanning lens.

8. A scanning optical system according to claim 1, wherein said light source and said scanning deflector are arranged so that a deflecting point on the scanning deflector is fixed.

9. A scanning optical system according to claim 1, wherein said scanning deflector is a plate mirror which has mirror surfaces on both sides.

10. A scanning optical system comprising:
a laser light source;
a scanning deflector for deflecting a laser beam from said laser light source;
a scanning lens for focusing deflected light on a scanning surface; and
a focusing point changing element, having substantially no power, for changing a focusing point in an auxiliary scanning plane, said focusing point changing element being positioned between said scanning deflector and said scanning lens, said focusing point changing element bringing the focusing point in a peripheral portion of said scanning surface near to said scanning lens as compared with a focusing point in the central portion of said scanning surface.

11. A scanning optical system comprising:
a scanning lens for focusing a scanning laser beam on a scanning surface; and
a focusing point changing element, having substantially no power, for changing a focusing point on the scanning surface, said element is disposed on an incident side of said scanning lens, said focusing point changing element bringing a focusing point in a peripheral portion of said scanning surface near to said scanning lens as compared with a focusing point in the central portion of said scanning surface.

12. A scanning optical system comprising:
a laser light source;
a scanning deflector for deflecting a laser beam from said laser light source;
a scanning lens for focusing deflected light on a scanning surface; and
a plane parallel plate disposed between said scanning deflector and said scanning lens, wherein said laser beam is incident onto said plane parallel plate and is a parallel beam in a principal scanning plane and a divergent beam in an auxiliary scanning plane.

13. A scanning optical system comprising:
a laser source;
a plate mirror, which has mirror surfaces on both sides, for deflecting a laser beam;
a scanning lens for focusing a deflected laser beam on a scanning surface; and
a focusing point changing element, having substantially no power, positioned between said plate mirror and said scanning lens, for changing a focusing point so that a curvature of field is reduced.

14. A scanning optical system according to claim 13, said focusing point changing element further comprising a plane parallel plate.

15. A scanning optical system comprising:
a light source;
a scanning deflector for deflecting a light beam from said light source;
a scanning lens for focusing deflected light on a scanning surface along an optical path; and
a focusing point changing element, having substantially no power, positioned between said scanning deflector and said scanning lens, for changing a focusing point on said scanning surface, said focusing point changing element varying the length of said optical path in accordance with the incident angle of said light beam into said focusing point changing element.

16. A scanning optical system according to claim 15, wherein said focusing point changing element changes the focusing point in an auxiliary scanning plane.

17. A scanning optical system according to claim 15, wherein said focusing point changing element brings the focusing point in a peripheral portion of said scanning surface near to said scanning lens as compared with a focusing point in the central portion of said scanning surface.

* * * * *

UNITED STATES PATENT AND TRADEMARK OFFICE
CERTIFICATE OF CORRECTION

PATENT NO. : 5,327,280

DATED : July 5, 1994

INVENTOR(S) : Akira MORIMOTO

It is certified that error appears in the above-indentified patent and that said Letters Patent is hereby corrected as shown below:

At column 11, line 23 (claim 7, line 4) of the printed patent, change "unto" to ---onto---.

Signed and Sealed this

Tenth Day of October, 1995

Attest:

BRUCE LEHMAN

Attesting Officer

Commissioner of Patents and Trademarks